(12) United States Patent
Frere et al.

(10) Patent No.: US 8,448,527 B2
(45) Date of Patent: May 28, 2013

(54) METHODS FOR USING SITE SPECIFIC WIND CONDITIONS TO DETERMINE WHEN TO INSTALL A TIP FEATURE ON A WIND TURBINE ROTOR BLADE

(75) Inventors: Ariane Frere, Brussels (BE); Pedro Luis Benito Santiago, Mostoles (ES); Klaus Ulrich Koegler, Rheine (DE)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 13/273,451

(22) Filed: Oct. 14, 2011

(65) Prior Publication Data

US 2012/0132011 A1 May 31, 2012

(51) Int. Cl.
 *G01P 5/06* (2006.01)
(52) U.S. Cl.
 USPC ....................................................... 73/861.85
(58) Field of Classification Search
 USPC ............... 73/861.85, 861.79, 861.87, 170.02
 See application file for complete search history.

(56) References Cited

U.S. PATENT DOCUMENTS

| | | | |
|---|---|---|---|
| 8,261,599 B2 * | 9/2012 | Jeffrey et al. | 73/66 |
| 2008/0286110 A1 | 11/2008 | Gupta et al. | |
| 2009/0257885 A1 | 10/2009 | Godsk et al. | |
| 2009/0266160 A1 * | 10/2009 | Jeffrey et al. | 73/455 |
| 2011/0206512 A1 * | 8/2011 | Hedges et al. | 416/61 |

FOREIGN PATENT DOCUMENTS

WO  WO 2008077403  7/2008

OTHER PUBLICATIONS

Co-pending and commonly assigned U.S. Appl. No. 12/837,529, filed Jul. 16, 2010.

\* cited by examiner

*Primary Examiner* — Jewel V Thompson
(74) *Attorney, Agent, or Firm* — Dority & Manning, P.A.

(57) ABSTRACT

A method for utilizing site specific data to determine whether to install a tip feature on a rotor blade of a wind turbine is disclosed. The method generally includes monitoring with a sensor at least one wind condition at a wind turbine site, determining an actual tip deflection threshold for a rotor blade of a wind turbine located at the wind turbine site based on the least one wind condition, comparing the actual tip deflection threshold to a predetermined tip deflection threshold for the rotor blade and determining whether to install a tip feature on the rotor blade based on the comparison between the actual tip deflection threshold and the predetermined tip deflection threshold.

20 Claims, 5 Drawing Sheets

METHODS FOR USING SITE SPECIFIC WIND CONDITIONS TO DETERMINE WHEN TO INSTALL A TIP FEATURE ON A WIND TURBINE ROTOR BLADE

FIELD OF THE INVENTION

The present subject matter relates generally to wind turbines and, more particularly, to a method for using site specific wind conditions in order to determine when to install a tip feature on a wind turbine rotor blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size, configuration and capacity of wind turbines. One such modification has been to include a tip feature, such as a winglet, at the tip of each wind turbine rotor blade. Generally, winglets can be employed to improve the overall efficiency and performance of a wind turbine. Winglets may also be installed on rotor blades to reduce the overall diameter of the wind turbine as well as to reduce noise emitted by the blades. Further, winglets may also provide an increase in the power coefficient of a wind turbine and, thus, reduce the cost of energy generated by the wind turbine.

It is generally understood that suction side winglets are more efficient than pressure side winglets. However, for wind turbines having rotors upwind of the tower, the use of suction side winglets can be very problematic. Specifically, installing a suction side winglet on a rotor blade reduces the distance between the tip of the rotor blade and the tower. Such a reduction in tower clearance can dramatically increase the risk of one or more of the rotor blades striking the tower, which can be a very costly event requiring considerable downtime to repair and/or replace damaged components. Catastrophic tower failure is also a possible outcome of a tower strike.

Accordingly, a method for using site specific wind conditions to determine when a tip feature, such as a suction side winglet or a tip extension, may be installed onto a rotor blade in order to increase the overall performance of the blade without significantly increasing the risk of a tower strike would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a method for utilizing site specific data to determine whether to install a tip feature on a rotor blade of a wind turbine. The method generally includes monitoring with a sensor at least one wind condition at a wind turbine site, determining an actual tip deflection threshold for a rotor blade of a wind turbine located at the wind turbine site based on the least one wind condition, comparing the actual tip deflection threshold to a predetermined tip deflection threshold for the rotor blade and determining whether to install a tip feature on the rotor blade based on the comparison between the actual tip deflection threshold and the predetermined tip deflection threshold.

In another aspect, the present subject matter discloses a method for utilizing site specific data to determine whether to install a suction side winglet on a rotor blade of a wind turbine. The method may generally include monitoring with a sensor at least one wind condition at a wind turbine site, determining an actual tip deflection threshold for a rotor blade of a wind turbine located at the wind turbine site based on the least one wind condition, comparing the actual tip deflection threshold to a predetermined tip deflection threshold for the rotor blade and determining whether to install a suction side winglet on the rotor blade based on the comparison between the actual tip deflection threshold and the predetermined tip deflection threshold.

In a further aspect, the present subject matter is directed to a method for utilizing site specific data to determine whether to install a tip feature on a rotor blade of a wind turbine. The method may generally include providing a rotor blade for a wind turbine having a predetermined tip deflection threshold based on a wind turbine classification for the wind turbine, determining an actual tip deflection threshold for the rotor blade based on at least one wind condition present at a wind turbine site of the wind turbine, comparing the actual tip deflection threshold to the predetermined tip deflection threshold and determining whether to install a tip feature on the rotor blade based on the comparison between the actual tip deflection threshold and the predetermined tip deflection threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to methods for using site specific wind data to determine when to install a tip feature onto a rotor blade. Specifically, the disclosed methods utilize site specific wind data in order to identify when the actual tip deflection experienced by a rotor blade varies from the deflection that the blade was designed to withstand. For example, the actual tip deflection experienced by a rotor blade during operation may often be much lower than the maximum allowable deflection, thereby creating a positive differential or deflection margin between the actual deflection and maximum allowable deflection. By identifying when such a deflection margin exists for a particular wind turbine, a tip feature that typically results in a reduction in the overall tower clearance (e.g., a suction side winglet or a tip extension) may be installed onto a rotor blade to improve its performance without significantly increasing the likelihood of a tower strike occurring.

Figure 1:
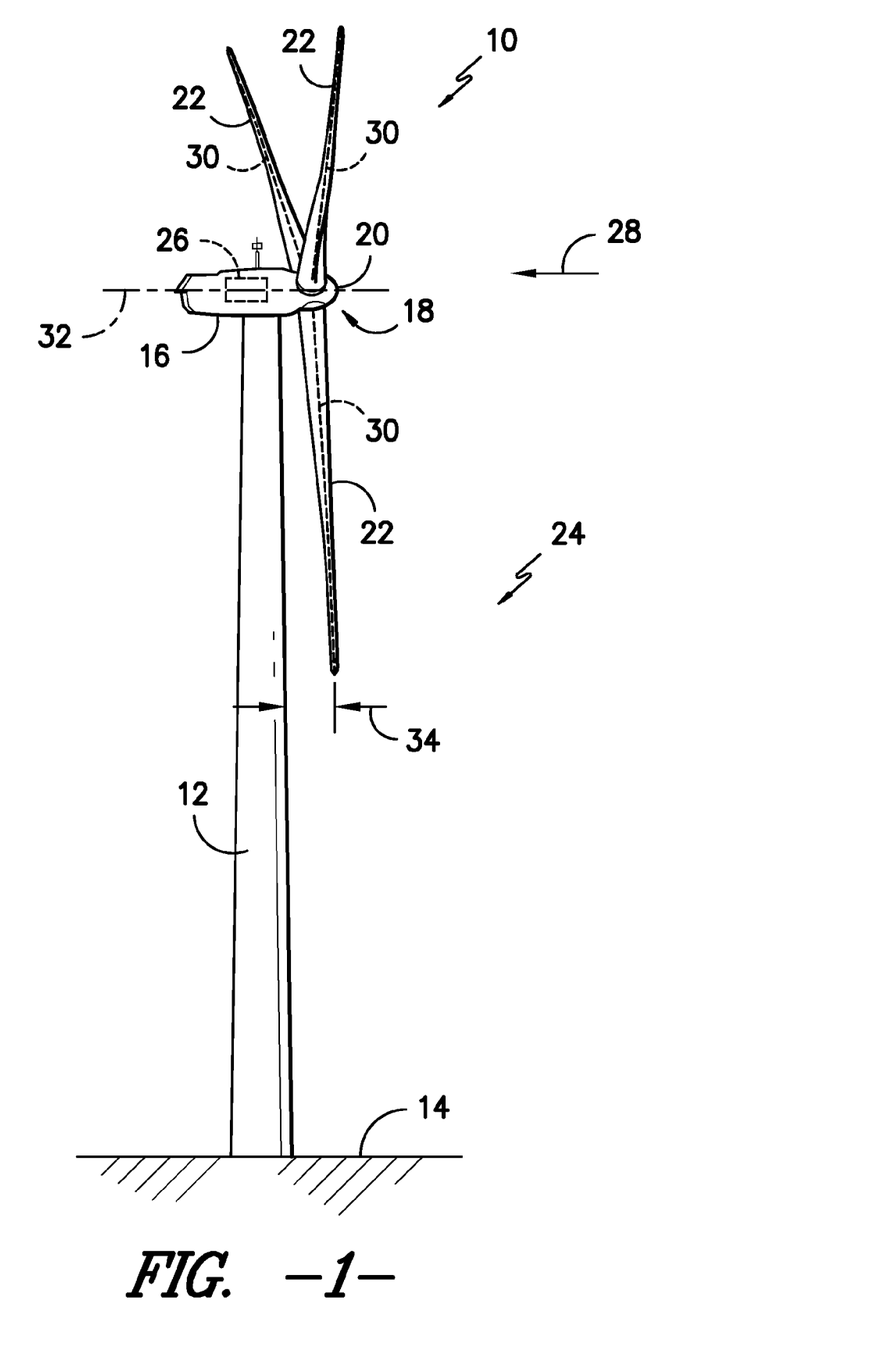
FIG. 1 illustrates a perspective view of one embodiment of a wind turbine.

FIG. 1 illustrates a perspective view of one embodiment of a wind turbine 10. As shown, the wind turbine 10 generally includes a tower 12 that extends from a support surface 14, a nacelle 16 mounted on the tower 12, and a rotor 18 coupled to the nacelle 16. The rotor 18 includes a rotatable hub 20 and at least one rotor blade 22 coupled to and extending outward from the hub 20. As shown, the rotor 18 includes three rotor blades 22. However, in an alternative embodiment, the rotor 18 may include more or less than three rotor blades 22. The rotor blades 22 may generally be spaced about the hub 20 to facilitate rotating the rotor 18 to enable kinetic energy to be transferred from the wind into usable mechanical energy, and subsequently, electrical energy.

The wind turbine 10 may generally be located at a wind turbine site 24. As shown, the wind turbine site 24 includes a single wind turbine 10. However, in other embodiments, any number of wind turbines 10 may be located at the wind turbine site 24. For example, the wind turbine site 24 may correspond to a wind turbine farm having a plurality of wind turbines 10.

Referring still to FIG. 1, the wind turbine 10 may also include a turbine control system or turbine controller 26 centralized within the nacelle 16. However, it should be appreciated that the turbine controller 26 may be disposed at any location on or in the wind turbine 10, at any location on the support surface 14 or generally at any other location. The controller 26 may generally be configured to control the various operating modes (e.g., start-up or shut-down sequences) and/or the components of the wind turbine 10. For example, the controller 26 may be configured to adjust a pitch angle or blade pitch of each of the rotor blades 22 (i.e., an angle that determines a perspective of the rotor blades 22 with respect to the direction 28 of the wind) by adjusting an angular position of at least one of the rotor blades 22 relative to the wind.

It should be appreciated that the turbine controller 26 may generally comprise any suitable processing unit, such as a computer or other computing device. Thus, in several embodiments, the turbine controller 26 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the turbine controller 26 to perform various functions including, but not limited to, monitoring one or more wind conditions at the wind turbine site 24 and determining the tip deflection of the rotor blades 22 based on the wind conditions at the wind turbine site 24. In addition, the controller 26 may also include various input/output channels for receiving inputs from sensors and/or other measurement devices and for sending control signals to the various components of the wind turbine 10.

Referring still to FIG. 1, during operation of the wind turbine 10, wind strikes the rotor blades 22 from direction 28, which causes the rotor 18 to rotate about an axis of rotation 32. As the rotor blades 22 are rotated and subjected to centrifugal forces, the rotor blades 22 may also subjected to various forces and bending moments. Thus, the rotor blades 22 may deflect from a neutral or non-deflected position to a deflected or loaded position, thereby reducing the distance or tower clearance 34 between each rotor blade 22 and the tower 12.

In order to reduce the likelihood of a tower strike occurring, rotor blades 22 are typically designed with sufficient stiffness so that the maximum deflection of each blade 22 is less than a predetermined deflection threshold. For example, according to international standard IEC-64100 (developed and published by the International Electrotechnical Commission), the maximum tip deflection of a rotor blade 22 must not exceed 70% of the static tower clearance (i.e., the tower clearance 34 defined between the rotor blades 22 and the tower 12 when the wind turbine 10 is not operating). Thus, rotor blades 22 installed on wind turbines 10 operating in accordance with this standard must be designed such that, even in extreme wind conditions, the maximum tip deflection of each blade 22 does not exceed the deflection threshold. This is often achieved by designing the rotor blades 22 based upon a particular wind turbine classification. Specifically, under IEC-64100, a wind turbine 10 may be assigned to one of three classifications based on the expected operating conditions of the wind turbine 10 including, but not limited to, the annual average wind speed and the wind speed of any extreme wind gusts that may occur over a particular time period (e.g., 50 years). For instance, a class 1 wind turbine may be designed to operate at annual average wind speeds of 10 meters per second (m/s) and may be adapted to withstand an extreme 50-year gust of 70 m/s, while a class 3 wind turbine may be designed to operate at annual average wind speeds of 7.5 m/s and may be adapted to withstand an extreme 50-year gust of 52.5 m/s. Accordingly, due to the difference in wind conditions, a rotor blade 22 designed for a class 1 wind turbine may be stiffer than a rotor blade 22 designed for a class 3 wind turbine in order to maintain the maximum tip deflection for the rotor blade below 70% of the static tower clearance, as required by the international standard.

Figure 2:
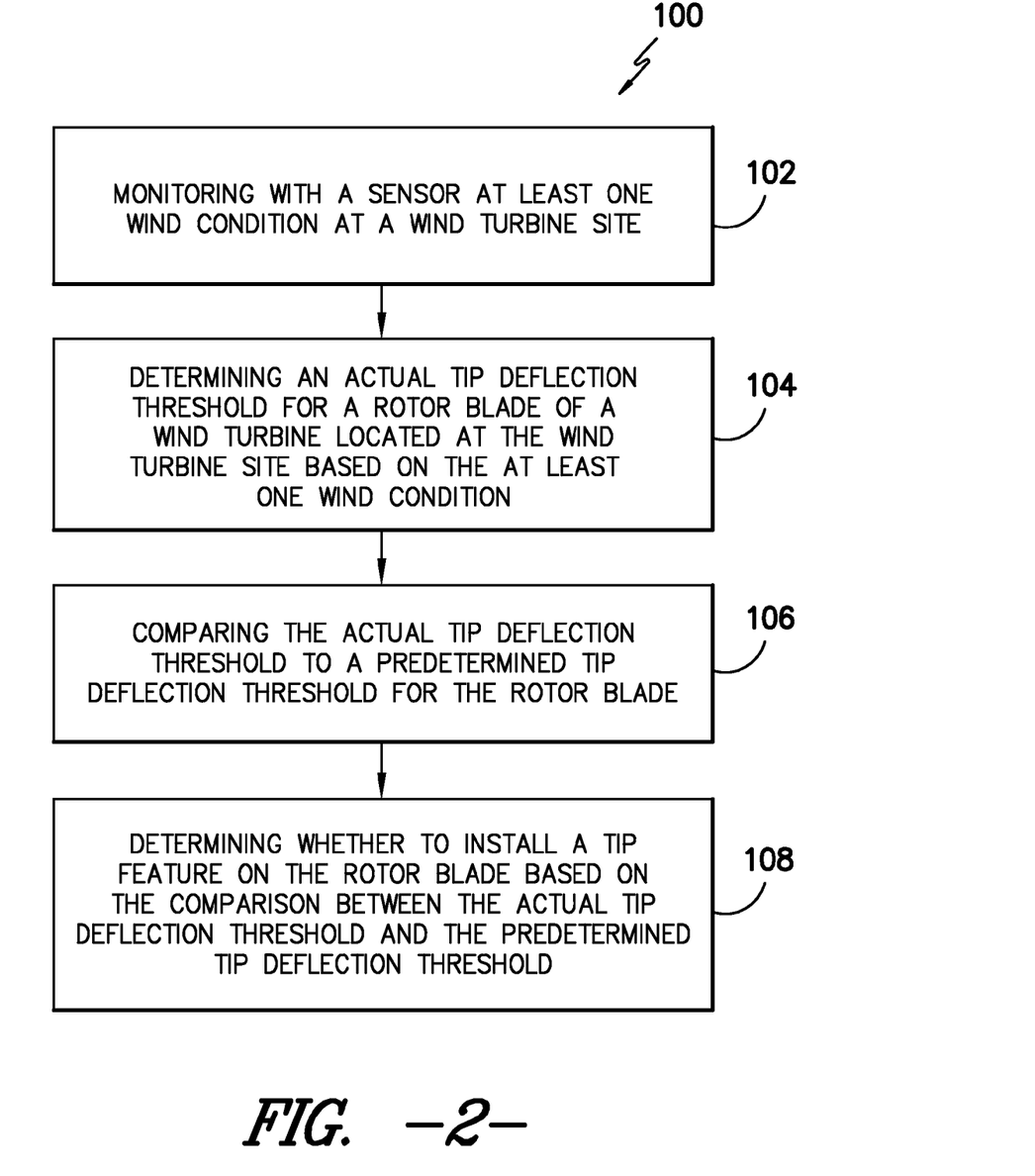
FIG. 2 illustrates a flow diagram of one embodiment of a method for using site specific wind conditions to determine when to install a tip feature onto a wind turbine rotor blade.

Referring now to FIG. 2, there is illustrated one embodiment of a method 100 for utilizing site specific wind data to determine whether to install a tip feature on a wind turbine rotor blade 22. As shown, the method 100 generally includes monitoring with a sensor at least one wind condition at a wind turbine site 102, determining an actual tip deflection threshold for a rotor blade of a wind turbine located at the wind turbine site based on the least one wind condition 104, comparing the actual tip deflection threshold to a predetermined tip deflection threshold for the rotor blade 106 and determining whether to install a tip feature on the rotor blade based on the comparison between the actual tip deflection threshold and the predetermined tip deflection threshold 108.

In general, the disclosed method 100 provides a means for utilizing site specific wind data to determine when to install a tip feature, such as a suction side winglet or a tip extension, onto a rotor blade 22. Specifically, the inventors of the present subject matter have found that rotor blades 22 are often designed to withstand higher wind conditions than those actually present at the particular site 24 at which a wind turbine 10 is installed. As a result, the actual deflection experienced by the rotor blades 22 during operation is often much lower than the deflection for which the rotor blades 22 were designed, thereby creating a positive differential or deflection margin between the actual deflection and maximum allowable deflection. By identifying when such a deflection margin exists for a particular wind turbine 10, a tip feature may be installed onto a rotor blade 22 to improve its overall performance without increasing the likelihood of the blade 22 striking the wind turbine tower 12.

In 102, at least one wind condition may be monitored at the site 24 of a wind turbine 10 using a sensor. In general, the wind conditions at a wind turbine site 24 may be monitored using any suitable wind data capable of being captured at the site 24 using any suitable sensors and/or sensing devices known in the art. For example, in several embodiments, wind speed measurements may be taken at the wind turbine site 24 to allow for various different wind conditions to be monitored. In such embodiments, a wind speed sensor 148 (FIGS. 3-5), such as an anemometer or other suitable sensing device, may be located at the wind turbine site 24, such as by being mounted to a portion of the wind turbine 10 (e.g., the nacelle 16) or by being disposed at any other suitable location at the wind turbine site 24, to permit wind speed measurements to be taken. Additionally, in one embodiment, the wind speed sensor 148 may be communicatively coupled (e.g., via a wired or wireless connection) to the turbine controller 26 (FIG. 1) to permit wind speed measurements to be transmitted to the controller 26 for subsequent storage and/or analysis. However, in other embodiments, the wind speed sensor 148 may be communicatively coupled to any other suitable processing unit capable of recording and/or analyzing the wind speed measurements.

The wind speed measurements provided by the wind speed sensor 148 may generally be utilized to calculate the actual and/or predicted wind conditions for the wind turbine site 24. For instance, an average wind speed and/or a wind speed distribution (i.e., the distribution or profile of the wind speed over an extended period of time) at the wind turbine site 24 may be calculated using the wind speed measurements. Similarly, the wind gusts (i.e., temporary changes in wind speed) and/or turbulence intensity (i.e., the ratio of the wind speed standard deviation to the mean wind speed taken over a specific period of time) at the wind turbine site 24 may also be determined by monitoring variations in the wind speed.

Figure 3:
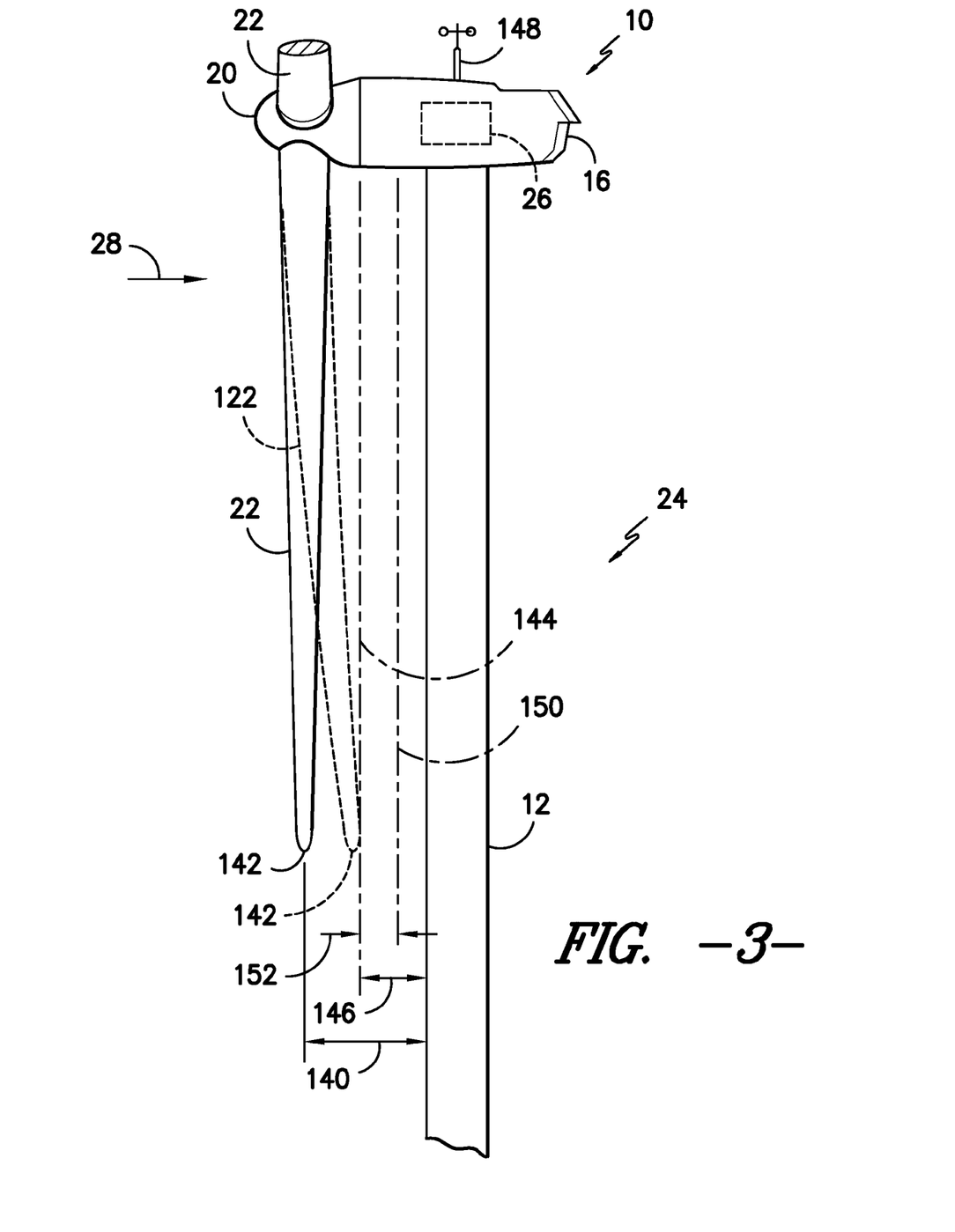
FIG. 3 illustrates a partial, side view of one embodiment of a wind turbine, particularly illustrating one of the rotor blades of the wind turbine in a non-deflected state and a deflected state.

In 104, an actual tip deflection threshold may be determined for a rotor blade 22 of a wind turbine 10 located at the wind turbine site 24 based on the monitored wind condition (s). As used herein, the term "actual tip deflection threshold" refers to a deflection limit corresponding to the maximum amount of tip deflection that may actually occur on a rotor blade 22 based on the wind conditions present at a particular wind turbine site 24. For example, FIG. 3 illustrates a partial, side view of one embodiment of a wind turbine 10, particularly illustrating a rotor blade 22 of the wind turbine 10 in a non-deflected state and a deflected state (indicated by dashed line 122). As shown, when the rotor blade 22 is in a non-deflected state, a maximum tower clearance 140 is defined between the rotor blade 22 and the tower 12. However, when the rotor blade 22 is subjected to the maximum wind conditions for the wind turbine site, a tip 142 of the deflected rotor blade 122 is disposed a maximum deflection position corresponding to the actual tip deflection threshold (indicated by dashed line 144). Thus, even in the most extreme wind conditions for the wind turbine site 24, a minimum tower clearance 146 is maintained between the actual tip deflection threshold 144 and the tower 12.

In several embodiments, the actual tip deflection threshold 144 for a rotor blade 22 may be determined by analyzing the monitored wind conditions at the wind turbine site 24. In particular, by monitoring the site specific wind conditions, the maximum tip deflection for a rotor blade 22 may be calculated based on the actual and/or anticipated loading that is and/or may be occurring on the blade 22 as a result of the wind conditions. However, one of ordinary skill in the art should appreciate that various other operating conditions and/or parameters (e.g., hub height, blade configuration and the like) may also be considered when determining the actual tip deflection threshold 144 of a rotor blade 22.

In several embodiments, the wind speed measurements provided by the wind speed sensor 148 may allow for the calculation and/or prediction of the maximum wind conditions for a particular wind turbine site 24. Specifically, as is generally understood, the maximum wind speed and/or maximum wind gust that may occur at a wind turbine site 24 may be measured directly (e.g., using the wind speed sensor 148) or may be calculated and/or predicted using various monitored wind conditions at the wind turbine site 24 including, but not limited to, the average wind speed and/or the wind speed distribution. For example, in several embodiments, the maximum wind speed and/or maximum wind gust for a wind turbine site 24 may be calculated as a function of average wind speed, such as by multiplying the average wind speed by a predetermined factor and/or percentage. In another embodiment, the maximum wind speed and/or maximum wind gust for a wind turbine site 24 may be calculated based on a probabilities analysis, such as by analyzing the probability of occurrence of a particular wind speed and/or wind gust based on the average wind speed and/or the wind speed distribution at the site 24. In alternative embodiments, it should be appreciated that that the maximum wind conditions for a wind turbine site 24 may be determined using any other suitable wind conditions and/or calculation methods known in the art.

Regardless, once the maximum wind conditions for a wind turbine site 24 are determined, the maximum loading that will occur on each rotor blade 22 due to such extreme wind conditions may be calculated, which can then be utilized to determine the maximum tip deflection for each blade 22. It should be appreciated that the development of equations, models, transfer functions and the like for correlating the maximum wind conditions of a wind turbine site 24 to the maximum deflection of a rotor blade 22 are well within the purview of one ordinary skill in the art and, thus, need not be described herein.

Additionally, it should be appreciated that, in several embodiments, the maximum tip deflection and, thus, the actual tip deflection threshold 144 may be determined automatically using the turbine controller 26 and/or any other suitable processing unit (such as a separate computer or computing device disposed at and/or remote to the wind turbine site 24). For example, as indicated above, the wind speed sensor 148 may be communicatively coupled to the turbine controller 26 and/or other processing unit to permit wind speed measurements to be transmitted to the controller 26 and/or other processing unit. In such an embodiment, the controller 26 and/or other processing unit may be provided with suitable equations, models, transfer functions and the like (e.g., stored as computer readable instructions on the controller/processing unit's memory elements) that, when implemented, configure the controller 26 and/or other processing unit to correlate the wind speed measurements to the actual tip deflection threshold 144.

Referring back to FIG. 2, in 106, the actual tip deflection threshold 144 determined above may be compared to a predetermined tip deflection threshold for the wind turbine 10. As used herein, the term "predetermined tip deflection threshold" refers to a deflection limit corresponding to the maximum allowable tip deflection that, based on the rotor blade design, can be accommodated without significantly increasing the risk of a tower strike. For example, as described above, a wind turbine 10 may often be assigned to one of three turbine classifications in accordance with international standards, with the rotor blades 22 of such a wind turbine being designed to maintain blade deflection below a predetermined threshold for the particular wind conditions designated for the assigned classification. In such instances, the predetermined tip deflection threshold may generally be selected to correspond to the predetermined threshold defined by these standards. For example, as shown in FIG. 3, in one embodiment, the predetermined tip deflection threshold (indicated by the dashed line 150) may be defined as 70% of the static tower clearance for the wind turbine 10 in accordance with international standard IEC-64100. However, in alternative embodiments, it should be appreciated that predetermined tip deflection threshold 150 may correspond to any other suitable design standard that may be utilized to define acceptable rotor blade deflections and/or tower clearances.

Referring still to FIG. 2, in 108, it may be determined whether to install a tip feature on one or more of the rotor blades 22 of a wind turbine 10 based on the comparison between the actual tip deflection threshold 144 and the predetermined tip deflection threshold 150. Specifically, in several embodiments, it may be determined whether to install a tip feature on the rotor blade(s) 22 based on whether a deflection margin exists between the actual tip deflection threshold 144 and the predetermined tip deflection threshold 150. For example, as shown in FIG. 3, due to the rotor blades 22 of the wind turbine 10 being designed to withstand higher wind conditions than those actually present at the wind turbine site 24, the actual tip deflection threshold 144 is disposed further away from the tower 12 than the predetermined tip deflection threshold 150. As a result, a differential or deflection margin 152 exists between the actual tip deflection threshold 144 and the predetermined tip deflection threshold 150 that corresponds to an additional distance through which the rotor blades 22 may deflect prior to exceeding the predetermined tip deflection threshold 152. Thus, in accordance with aspects of the present subject matter, a tip feature designed to improve the overall performance of the wind turbine 10 may be installed onto one or more of the rotor blades 22 in order to take advantage of the existence of the deflection margin 152 without increasing the likelihood of a tower strike occurring.

Figure 4:
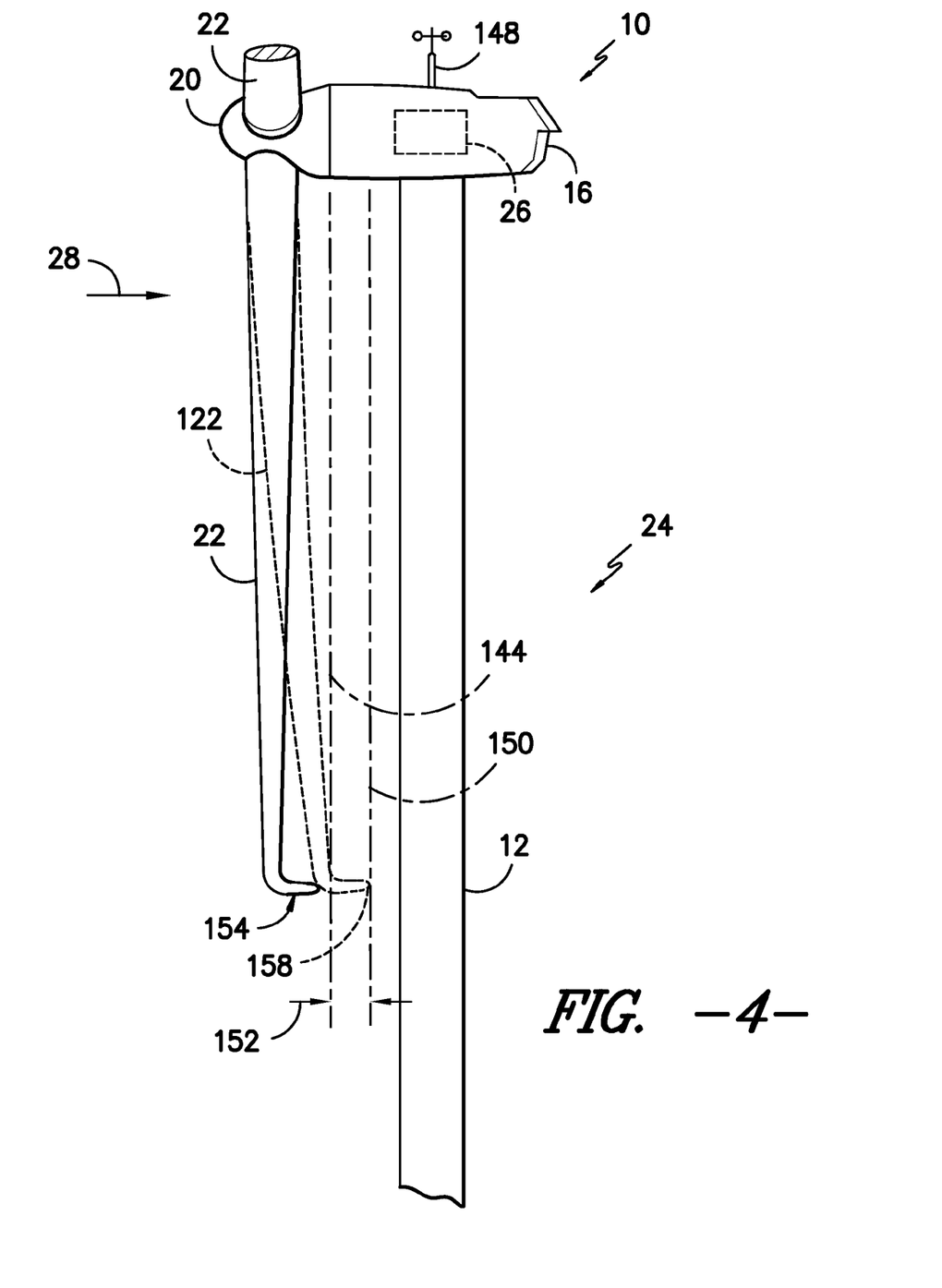
FIG. 4 illustrates one embodiment of the wind turbine shown in FIG. 3 having a suction side winglet installed onto one of the rotor blades; and, FIG. 5 illustrates one embodiment of the wind turbine shown in FIG. 3 having a tip extension installed onto one of the rotor blades.

For example, in several embodiments, a suction side winglet may be installed onto one or more of the rotor blades 22 of a wind turbine 10 when it is determined that a deflection margin 152 exists. Specifically, FIG. 4 illustrates a partial, side view of one embodiment of the wind turbine 10 shown in FIG. 3 having a suction side winglet 154 installed onto one of its rotor blades 22, particularly illustrating the rotor blade 22 in a non-deflected state and a deflected state (indicated by dashed line 122). As shown, the winglet 154 generally extends towards the tower 12 a distance or height 156 (measured from a longitudinal or pitch axis 30 (FIG. 1) of the rotor blade 22 to the winglet tip 158) that is equal to or less than the distance defined by the deflection margin 152. Thus, when the rotor blade 22 is subjected to the maximum wind conditions at the wind turbine site 24, the maximum tip deflection of the deflected rotor blade 122 may be maintained at a level that is equal to or less than the predetermined tip deflection threshold 150. As such, the numerous advantages of a suction side winglet 154 (e.g., an increase in power coefficient and a reduction in drag and noise) may be obtained without significantly increasing the likelihood of a tower strike occurring.

Figure 5:
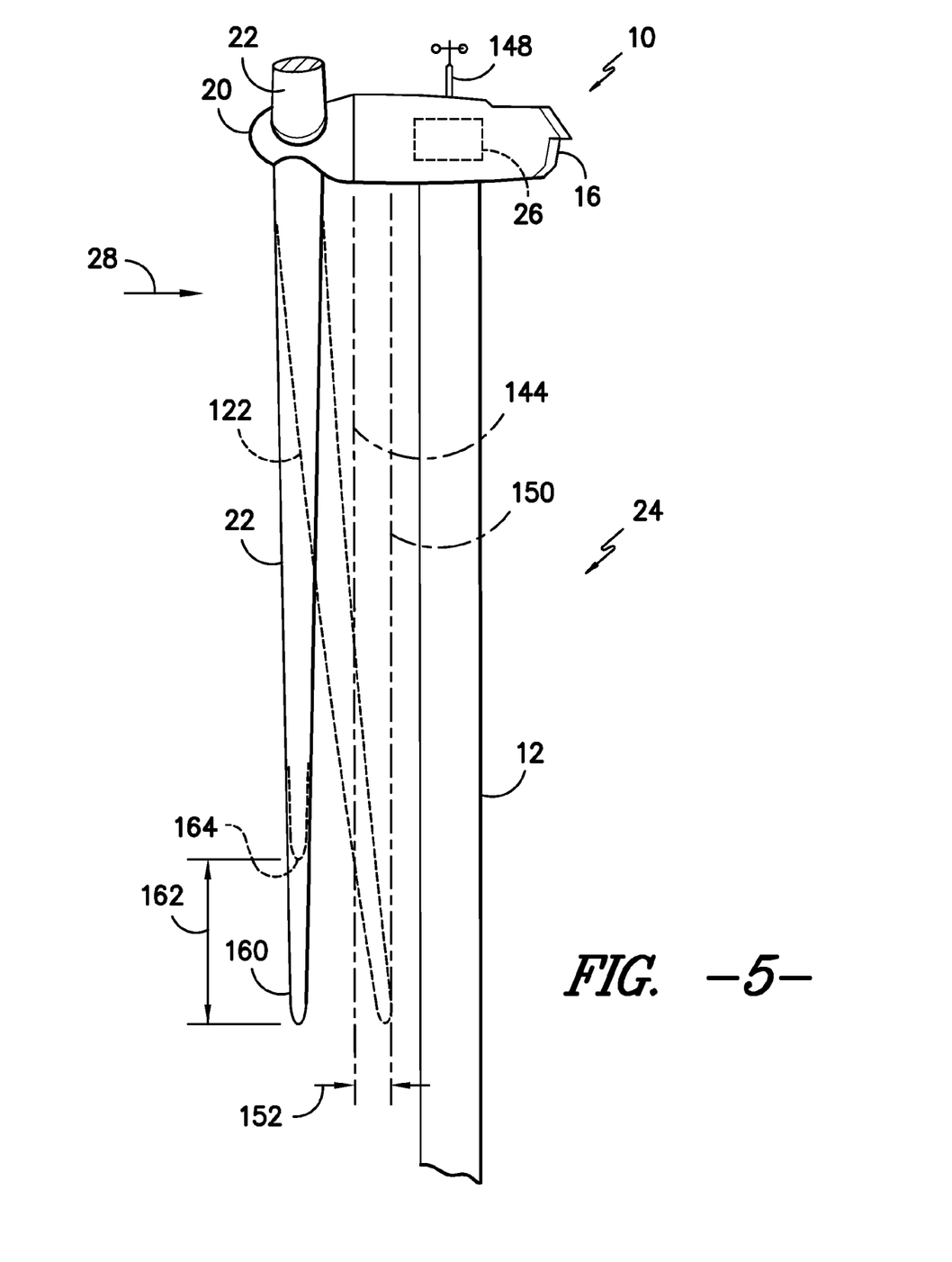

In alternative embodiments, it should be appreciated that any other suitable tip feature may be installed onto one or more of the rotor blades 22 of a wind turbine 10 in order to take advantage of the existence of a deflection margin 152. For example, FIG. 5 illustrates a partial, side view of one embodiment of the wind turbine 22 shown in FIG. 3 having a tip extension 160 installed onto one of its rotor blades 22, particularly illustrating the rotor blade 22 in a non-deflected state and a deflected state (indicated by dashed line 122). As is generally understood, the installation of a tip extension 160 may increase the rotor blade's effective length, thereby improving the blade's ability to capture energy form the wind. However, the added length also results in increased loading on the rotor blade 22, thereby increasing the rotor blade's deflection. Thus, in several embodiments, a length 162 of the tip extension 160 (measured from an original tip location 164 of the rotor blade 22) may be chosen so that the overall increase in blade deflection is equal to or less than the distance defined by the deflection margin 152. Thus, when the rotor blade 22 is subjected to the maximum wind conditions at the wind turbine site 24, the maximum tip deflection of the rotor blade 22 may be maintained at a level that is equal to or less than the predetermined tip deflection threshold 150. As such, the various advantages of installing a tip extension 160 onto a rotor blade 22 (e.g., an increase in power production) may be obtained without significantly increasing the likelihood of a tower strike occurring.

It should be appreciated that the tip features 154, 160 described herein may be installed on the rotor blade(s) 22 of a wind turbine 10 using any suitable installation means and/or method known in the art. For example, in several embodiments, an outboard portion of the rotor blade 22 including the blade tip may be removed from the blade 22 and replaced with the tip feature 154, 160. In another embodiment, the tip feature 150, 164 may be installed onto and/or over the existing blade tip of the rotor blade 22.

It should also be appreciated that, in several embodiments, the comparison between the actual tip deflection threshold 144 and the predetermined tip deflection threshold 150 and the determination of whether to install a tip feature 154, 160 may be made automatically using the turbine controller 26 and/or any other suitable processing unit (such as a separate computer or computing device disposed at and/or remote to the wind turbine site 24). For example, the controller 26 and/or other processing unit may be provided with suitable models, decision logic and the like (e.g., stored as computer readable instructions on the controller/processing unit's memory elements) that, when implemented, configure the controller 26 and/or other processing unit to both compare the actual tip deflection threshold 144 to the predetermined tip deflection threshold 150 and to determine whether to install a tip feature 154, 160 onto one or more of the rotor blades 22 of a wind turbine 10.

Additionally, it should be appreciated that, in several embodiments, the present subject matter is also directed to a method for utilizing site specific data to determine whether to install a suction side winglet 152 on a rotor blade 22 of a wind turbine 10. For example, the method may include monitoring with a sensor (e.g., wind speed sensor 148) at least one wind condition at the wind turbine site 24, determining an actual tip deflection threshold 144 for the rotor blade 22 of a wind turbine 10 located at the site 24 based on the least one wind condition, comparing the actual tip deflection threshold 144 to a predetermined tip deflection threshold 150 for the rotor blade 22 and determining whether to install the suction side winglet 154 on the rotor blade 22 based on the comparison between the actual tip deflection threshold 144 and the predetermined tip deflection threshold 150.

Moreover, in further embodiments, the present subject matter is also directed to a method for utilizing site specific data to determine whether to install a tip feature on a rotor blade of a wind turbine, wherein the method includes providing a rotor blade 22 for a wind turbine 10 having a predetermined tip deflection threshold 150 based on a wind turbine classification for the wind turbine (e.g., the wind turbine classifications assigned per international standard IEC-64100), determining an actual tip deflection threshold 144 for the rotor blade 22 based on at least one wind condition present at a wind turbine site 24, comparing the actual tip deflection threshold 144 to the predetermined tip deflection threshold 150 and determining whether to install a tip feature (e.g., a suction side winglet 144 or a tip extension 160) on the rotor blade 22 based on the comparison between the actual tip deflection threshold 144 and the predetermined tip deflection threshold 150.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for utilizing site specific data to determine whether to install a tip feature on a rotor blade of a wind turbine, the method comprising:
   monitoring with a sensor at least one wind condition at a wind turbine site;
   determining an actual tip deflection threshold for a rotor blade of a wind turbine located at the wind turbine site based on the least one wind condition;
   comparing the actual tip deflection threshold to a predetermined tip deflection threshold for the rotor blade; and,
   determining whether to install a tip feature on the rotor blade based on the comparison between the actual tip deflection threshold and the predetermined tip deflection threshold.

2. The method of claim 1, wherein monitoring with a sensor at least one wind condition at a wind turbine site comprises measuring with a wind speed sensor a wind speed at the wind turbine site.

3. The method of claim 1, further comprising analyzing the at least one wind condition to determine a maximum wind condition for the wind turbine site.

4. The method of claim 3, wherein determining an actual tip deflection threshold for a rotor blade of a wind turbine located at the wind turbine site based on the least one wind condition comprises determining the actual tip deflection threshold based on the maximum wind condition at the wind turbine site.

5. The method of claim 1, wherein determining an actual tip deflection threshold for a rotor blade of a wind turbine located at the wind turbine site based on the least one wind condition comprises determining with a processing unit the actual tip deflection threshold based on signals received from the sensor.

6. The method of claim 1, wherein comparing the actual tip deflection threshold to a predetermined tip deflection threshold for the rotor blade comprises comparing the actual tip deflection threshold to the predetermined tip deflection threshold to determine if a deflection margin exists between the actual tip deflection threshold and the predetermined tip deflection threshold.

7. The method of claim 6, wherein determining whether to install a tip feature on the rotor blade based on the comparison between the actual tip deflection threshold and the predetermined tip deflection threshold comprises determining whether to install the tip feature based on the existence of the deflection margin.

8. The method of claim 7, further comprising installing a suction side winglet on the rotor blade based on the deflection margin.

9. The method of claim 8, wherein a height of the suction side winglet is equal to or less than the deflection margin.

10. The method of claim 7, further comprising installing a tip extension on the rotor blade based on the deflection margin.

11. The method of claim 1, wherein the predetermined blade deflection threshold is equal to about 70% of a static tower clearance of the wind turbine.

12. A method for utilizing site specific data to determine whether to install a suction side winglet on a rotor blade of a wind turbine, the method comprising:
    monitoring with a sensor at least one wind condition at a wind turbine site;
    determining an actual tip deflection threshold for a rotor blade of a wind turbine located at the wind turbine site based on the least one wind condition;
    comparing the actual tip deflection threshold to a predetermined tip deflection threshold for the rotor blade; and,
    determining whether to install a suction side winglet on the rotor blade based on the comparison between the actual tip deflection threshold and the predetermined tip deflection threshold.

13. The method of claim 12, wherein monitoring with a sensor at least one wind condition at a wind turbine site comprises measuring with a wind speed sensor a wind speed at the wind turbine site.

14. The method of claim 12, further comprising analyzing the at least one wind condition to determine a maximum wind condition for the wind turbine site.

15. The method of claim 14, wherein determining an actual tip deflection threshold for a rotor blade of a wind turbine located at the wind turbine site based on the least one wind condition comprises determining the actual tip deflection threshold based on the maximum wind condition at the wind turbine site.

16. The method of claim 12, wherein determining an actual tip deflection threshold for a rotor blade of a wind turbine located at the wind turbine site based on the least one wind condition comprises determining with a processing unit the actual tip deflection threshold based on signals received from the sensor.

17. The method of claim 12, wherein comparing the actual tip deflection threshold to a predetermined tip deflection threshold for the rotor blade comprises comparing the actual tip deflection threshold to the predetermined tip deflection threshold to determine if a deflection margin exists between the actual tip deflection threshold and the predetermined tip deflection threshold.

18. The method of claim 17, wherein determining whether to install a suction side winglet on the rotor blade based on the comparison between the actual tip deflection threshold and the predetermined tip deflection threshold comprises determining whether to install the suction side winglet based on the existence of the deflection margin.

19. The method of claim 18, further comprising installing the suction side winglet on the rotor blade based on the deflection margin.

20. A method for utilizing site specific data to determine whether to install a tip feature on a rotor blade of a wind turbine, the method comprising:
providing a rotor blade for a wind turbine having a predetermined tip deflection threshold based on a wind turbine classification for the wind turbine;
determining an actual tip deflection threshold for the rotor blade based on at least one wind condition present at a wind turbine site of the wind turbine;
comparing the actual tip deflection threshold to the predetermined tip deflection threshold; and,
determining whether to install a tip feature on the rotor blade based on the comparison between the actual tip deflection threshold and the predetermined tip deflection threshold.

* * * * *